(12) United States Patent
Nordhaus et al.

(10) Patent No.: US 12,145,419 B2
(45) Date of Patent: Nov. 19, 2024

(54) ADAPTIVE STABILIZER BAR WITH CYCLOIDAL DRIVE

(71) Applicant: AirBoss Flexible Products, LLC, Auburn Hills, MI (US)

(72) Inventors: Mark J. Nordhaus, Farmington, MI (US); Jeffrey D. Auten, West Bloomfield, MI (US); Jeffrey Chamberlin, Madison Heights, MI (US); Aidan Gusho, Birmingham, MI (US)

(73) Assignee: AirBoss Flexible Products, LLC, Auburn Hills, MI (US)

( * ) Notice: Subject to any disclaimer, the term of this patent is extended or adjusted under 35 U.S.C. 154(b) by 16 days.

(21) Appl. No.: 18/112,990

(22) Filed: Feb. 22, 2023

(65) Prior Publication Data

US 2024/0278615 A1    Aug. 22, 2024

(51) Int. Cl.
*B60G 21/10* (2006.01)
*F16H 37/12* (2006.01)

(52) U.S. Cl.
CPC ......... *B60G 21/106* (2013.01); *F16H 37/122* (2013.01); *B60G 2202/42* (2013.01); *B60G 2202/43* (2013.01); *B60G 2204/82* (2013.01)

(58) Field of Classification Search
CPC ........ B60G 2202/42; B60G 2204/4191; B60G 2202/135; B60G 21/0556; B60G 21/0558; B60G 21/106; B60G 2202/43; B60G 2204/82
USPC ........................................ 280/5.511, 124.106
See application file for complete search history.

(56) References Cited

U.S. PATENT DOCUMENTS

| | | | | |
|---|---|---|---|---|
| 6,022,030 A | * | 2/2000 | Fehring | B60G 21/0553 280/5.511 |
| 6,428,019 B1 | * | 8/2002 | Kincad | F16D 11/10 280/124.152 |
| 6,698,767 B2 | * | 3/2004 | Hagan | B60G 9/00 280/5.511 |
| 7,717,437 B2 | | 5/2010 | Adams, III et al. | |
| 7,832,739 B2 | * | 11/2010 | Pinkos | B60G 3/20 280/124.152 |
| 7,887,071 B2 | | 2/2011 | Grieshaber et al. | |
| 9,415,797 B2 | * | 8/2016 | Wang | B62D 5/008 |
| 10,378,613 B1 | * | 8/2019 | Lee | F16H 1/32 |
| 10,618,370 B2 | * | 4/2020 | Seo | B60G 17/0157 |
| 10,987,990 B2 | * | 4/2021 | Lim | B60G 21/0553 |
| 2002/0113393 A1 | | 8/2002 | Urbach | |
| 2010/0013175 A1 | | 1/2010 | Maeda et al. | |
| 2010/0327549 A1 | | 12/2010 | Barth et al. | |
| 2013/0099455 A1 | | 4/2013 | Beringer et al. | |

(Continued)

FOREIGN PATENT DOCUMENTS

WO    WO-2017187056 A1 * 11/2017 ........... B62D 5/0421

*Primary Examiner* — Paul N Dickson
*Assistant Examiner* — Caitlin Anne Miller
(74) *Attorney, Agent, or Firm* — WARNER NORCROSS + JUDD LLP (57) ABSTRACT

An improved adaptive stabilizer bar is provided. The stabilizer bar includes a cycloidal drive between first and second portions of a divided torsion bar. The cycloidal drive includes a cycloidal gear assembly that provides a significant mechanical advantage, allowing relatively small electric motors to be used. In addition, the cycloidal gear assembly has a relatively small physical footprint, particularly when compared to a planetary gear assembly, for example.

17 Claims, 10 Drawing Sheets

(56) References Cited

U.S. PATENT DOCUMENTS

2018/0086172 A1    3/2018  Breton et al.
2022/0144037 A1*  5/2022  Rosinski ............ B60G 17/0162
2022/0314431 A1* 10/2022  Brenner ................. F16H 55/06

* cited by examiner

ADAPTIVE STABILIZER BAR WITH CYCLOIDAL DRIVE

FIELD OF THE INVENTION

The present invention relates to stabilizer bars, and more particularly, adaptive stabilizer bars for use with a vehicle suspension.

BACKGROUND OF THE INVENTION

Stabilizer bars, also referred to as sway bars, are used in vehicle suspensions to resist a rolling moment during a turn. Stabilizer bars are found in front and rear suspensions, and are generally U-shaped, having an intermediate torsion bar joined to first and second arm segments. The arm segments are typically joined to respective vehicle wheels via a link assembly. During a vehicle turn, the first arm segment and the second arm segment move relative to each other, imparting a torsional force on the torsion bar. The torsional stiffness of the torsion bar helps counter the vehicle's tendency to lean towards the outside of a turn while cornering.

In some applications, it is desirable to vary the torsional stiffness of the torsion bar during vehicle travel. Adaptive stabilizer bars have been developed to control torsional stiffness in real time. These systems include an actuator to rotate one portion of the stabilizer bar relative to another portion of the stabilizer bar. For example, it is known to raise the stabilizer arm segment on the inside of a turn and/or lower the stabilizer arm segment on the outside of the vehicle turn to maintain the vehicle body in a level attitude while cornering.

Because a significant torsional load can be demanded of adaptive stabilizer bars, particularly for heavier vehicles, known systems include somewhat larger actuators, including for example electric motors and hydraulic motors. In addition, known adaptive stabilizer bars include added complexity and cost, and for that reason are primarily found in higher priced vehicles.

Accordingly, there remains a continued need for an improved adaptive stabilizer bar. In particular, there remains a continued need for an improved adaptive stabilizer bar having a reduced size when compared to existing designs and that can impart high torsional loads for a wide range of vehicles, including electric vehicles, without sacrificing performance or reliability.

SUMMARY OF THE INVENTION

An improved adaptive stabilizer bar is provided. The stabilizer bar includes a cycloidal drive between first and second portions of a divided torsion bar. The cycloidal drive includes a cycloidal gear assembly that provides a significant mechanical advantage, allowing relatively small electric motors to be used. In addition, the cycloidal gear assembly has a relatively small physical footprint, particularly when compared to a planetary gear assembly, for example.

In one embodiment, the cycloidal drive includes a cam drive gear, an input shaft having first and second eccentric cams, first and second cycloidal gears that oscillate by operation of the eccentric cams, and a ring gear surrounding at least one of the first and second cycloidal gears. The cam drive gear is intermeshed with an input gear that is driven by the electric motor, for example a servo motor. The first cam engages the first cycloidal gear, and the second cam engages the second cycloidal gear. The second cam is axially offset from the first cam and 180-degrees of out phase from the first cam. In this respect, the first cycloidal gear oscillates 180-degrees out of phase from the second cycloidal gear to compensate for unbalanced forces caused by rotation of the second cycloidal gear.

In another embodiment, the first and second cycloidal gears include a plurality of lobes along their outer periphery. The cycloidal drive also includes a plurality of rollers that are sandwiched between the second cycloidal gear and an output gear. The output gear includes a conical body that narrows from a first outer diameter to a second outer diameter. These components are self-contained within a gearbox housing, the gearbox housing having first and second co-axial openings for a first half-bar and a second half-bar of the divided torsion bar.

As discussed herein, the first and second cycloidal gears are set into a "wobble" motion via the rotation of the first and second cams that are rotatably driven by the cam drive gear. For every rotation of the second cam, the second cycloidal gear advances one roller. The output gear rotates in unison with the second cycloidal gear, thus achieving a significant torque advantage and speed reduction in a compact environment. The cycloidal drive is disposed between the mutually facing ends of the divided torsion bar, the cycloidal drive being operable to rotate the second half-bar relative to the first half-bar by operation of an electric motor.

These and other features and advantages of the present invention will become apparent from the following description of an embodiment of the invention, when viewed in accordance with the accompanying drawings and appended claims. It will be appreciated that any of the preferred and/or optional features of the invention may be incorporated alone, or in appropriate combination, within embodiments of the invention, while still falling within the scope of claim 1, even if such combinations are not explicitly claimed in the appended claims.

DETAILED DESCRIPTION OF THE CURRENT EMBODIMENT

Figure 1:
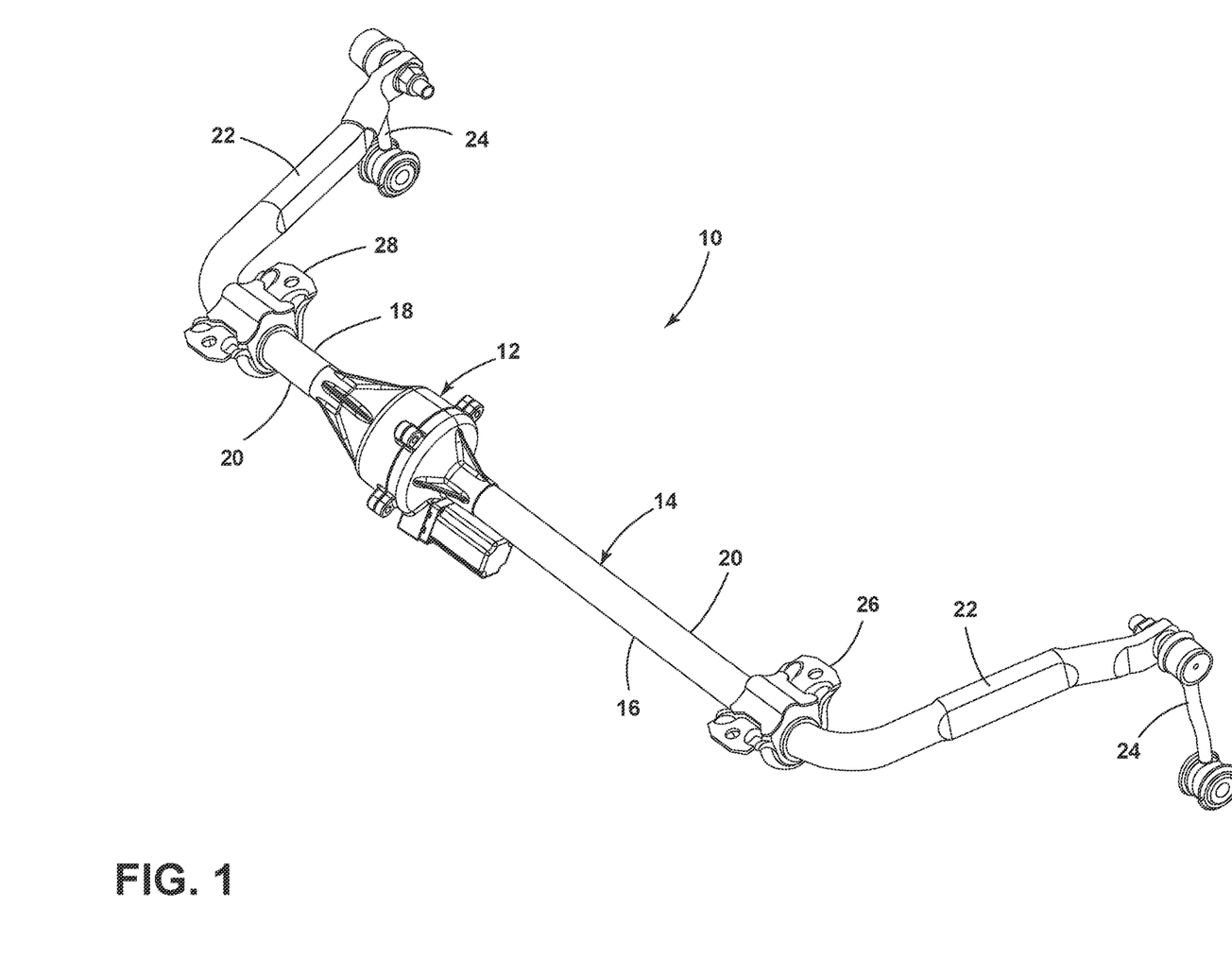
FIG. 1 is a perspective view of an adaptive stabilizer bar in accordance with one embodiment of the invention.

Turning now to FIG. 1, an adaptive stabilizer bar according to one embodiment is illustrated and generally designated 10. The adaptive stabilizer bar 10 is configured for attachment to the body of a motor vehicle and includes a cycloidal drive 12 coupled between first and second portions of a divided torsion bar 14. In particular, the cycloidal drive 12 is coupled between a first half-bar 16 and a second half-bar 18, with each half bar including a longitudinal segment 20 and an arm segment 22. As used herein, "half-bar" means that the divided torsion bar is comprised of two or more bars, which may or may not be equal in size. In the illustrated embodiment, for example, the first half-bar 14 includes a longer longitudinal segment 20 than the second half-bar 18, however in other embodiments each half-bar is equal in size.

The torsion bar 14 is subjected to a torsional load when one arm segment 22 moves relative to the other arm segment 22. Each arm segment 22 is connected to a link assembly 24, which is coupled to a vehicle wheel (not shown). The adaptive stabilizer bar 10 also includes a first pivot bearing 26 coupled to the first half-bar 16 and a second pivot bearing 28 coupled to the second half-bar 18, with each bearing 26, 28 being configured for attachment to a vehicle body.

Figure 2:
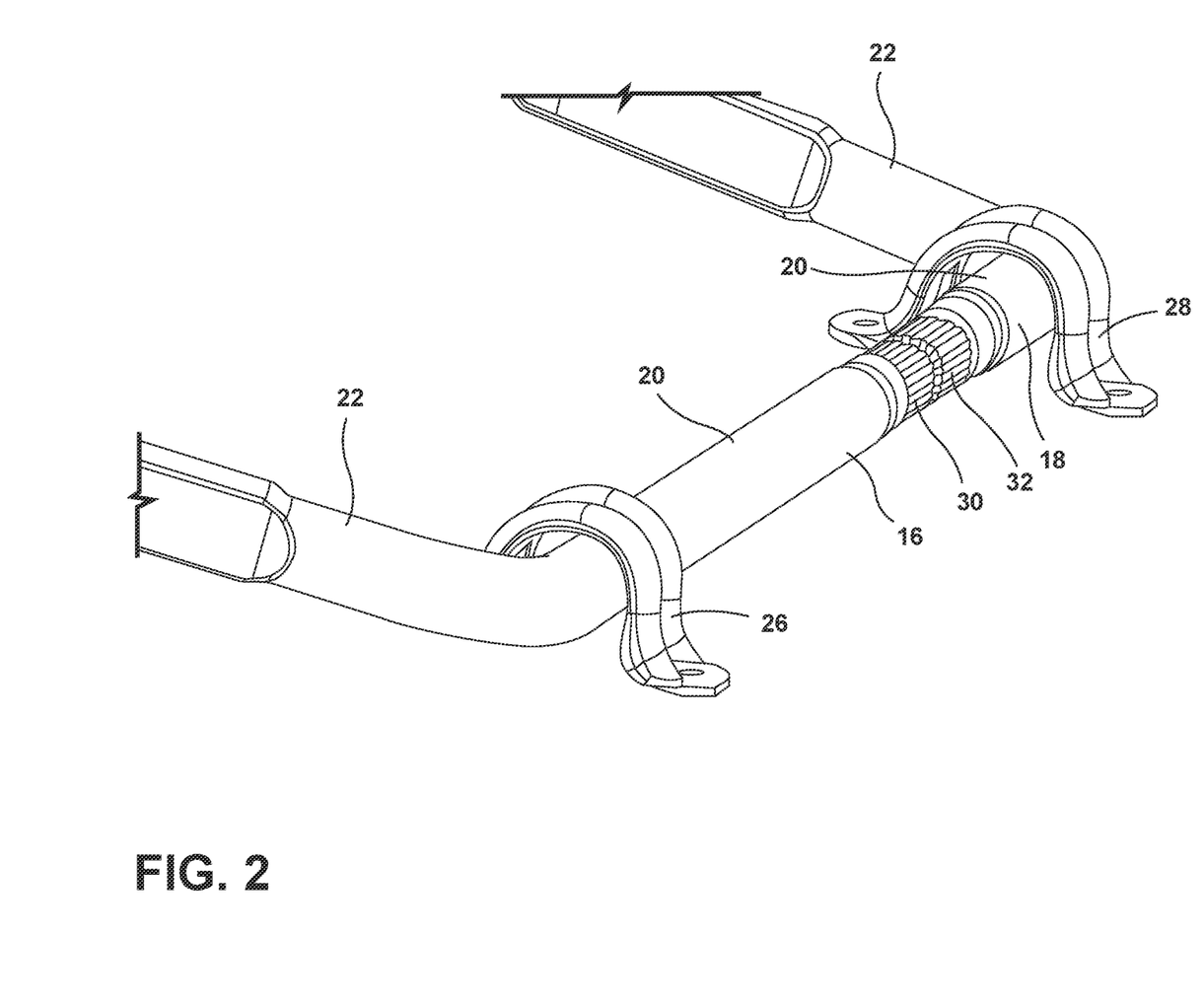
FIG. 2 is a close-up perspective view of a divided torsion bar having first and second half bars with mutually facing end portions.

As shown in FIG. 2, each half-bar 16, 18 includes mutually facing end portions 30, 32. Each end portion 30, 32 is splined for engaging the cycloidal drive 12. Each arm segment 22 is integrally joined to the corresponding longitudinal segment 20. In other embodiments, however, the arm segment 22 and the corresponding longitudinal segment 20 are formed separately and are coupled together such that they pivot in unison with each other.

Figure 3:
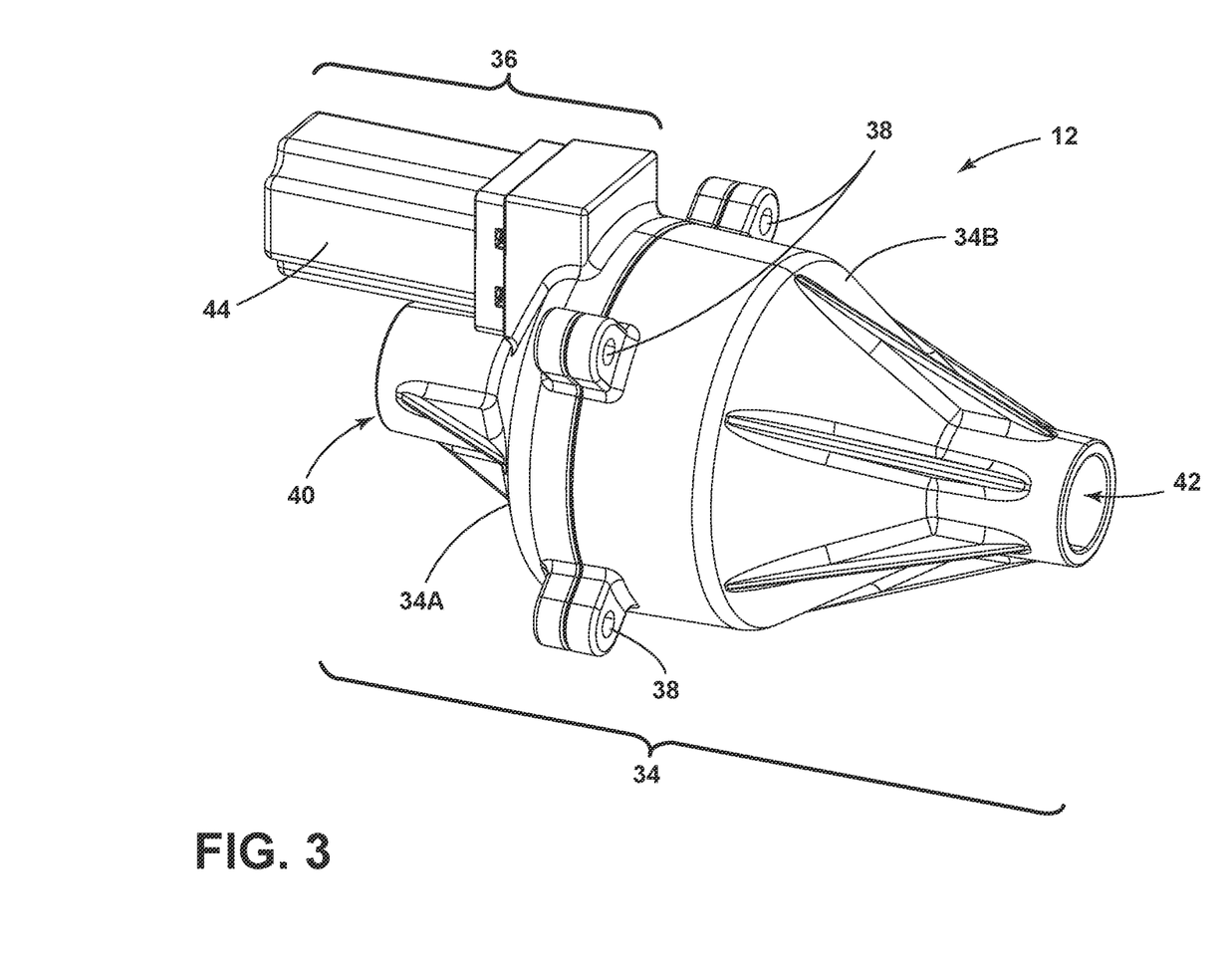
FIG. 3 is a perspective view of a cycloidal drive for the adaptive stabilizer bar of FIG. 1.
Figure 4:
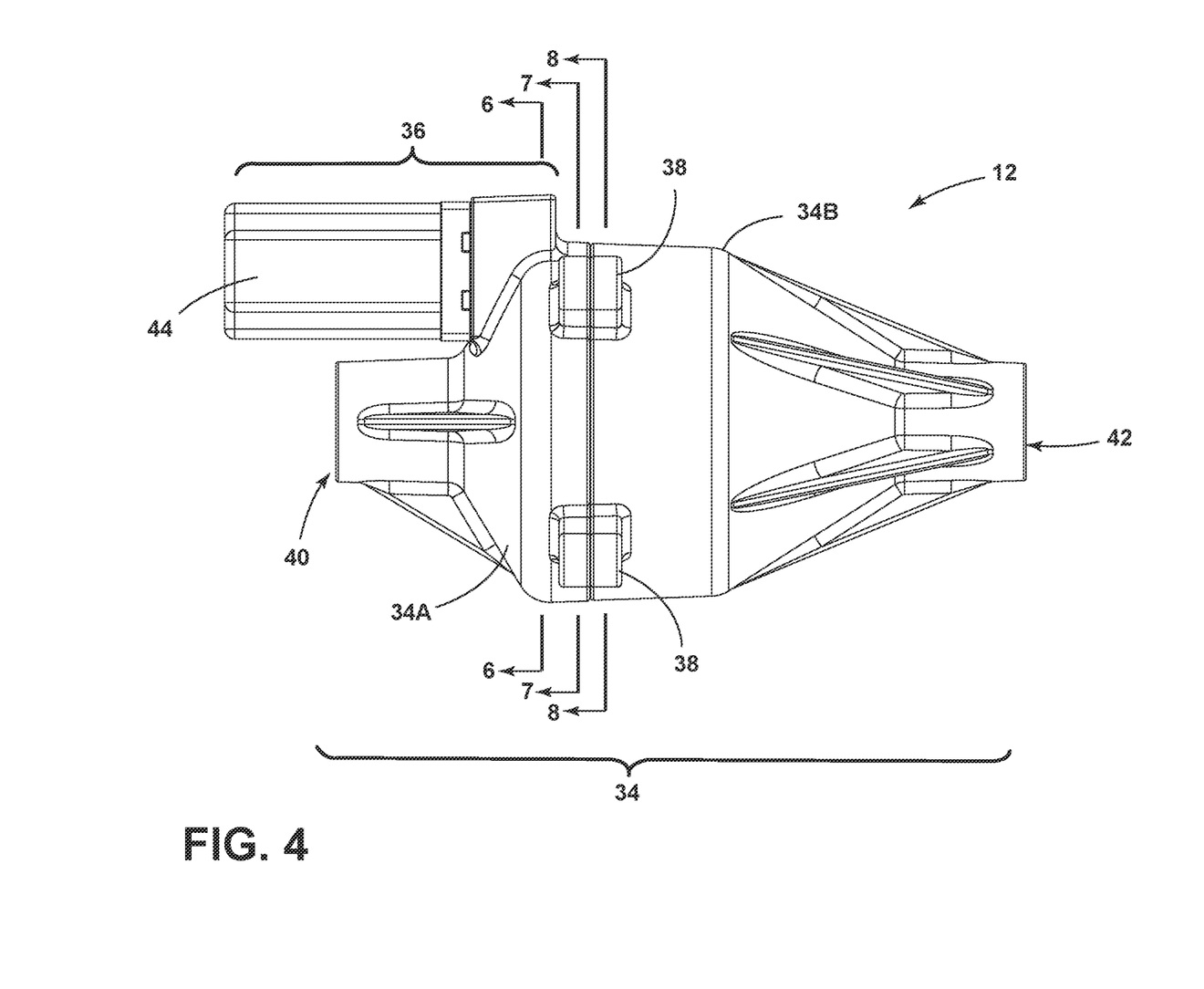
FIG. 4 is side elevation view of a cycloidal drive of FIG. 3.

Referring now to FIGS. 3-4, the cycloidal drive 12 includes a gear housing 34 for a cycloidal gear assembly and a motor housing 36 for an electric motor, for example a servomotor. The gear housing 34 includes a first portion 34A joined to a second portion 34B via a plurality of fasteners (not shown) that are received within aligned openings 38. The gear housing 34 also includes a first axial opening 40 for the first half-bar 16 and a second axial opening 42 for the second half-bar 18. The first half-bar 16 is firmly affixed within the first axial opening 40, while the second half-bar 18 is rotatably received within the second axial opening 42, being rotatable by operation of an electric motor 44. When the electric motor 44 is activated, the second half-bar 18 is twisted relative to the first half-bar 16, and a torsion moment is generated. Because the electric motor 44 is bi-directional, the second half-bar 18 can be twisted relative to the first half-bar 16 in the clockwise or counter-clockwise directions. The motor housing 36 extends longitudinally from the gear housing 34, parallel to the longitudinal arm segment of the first half-bar 16.

Figure 5:
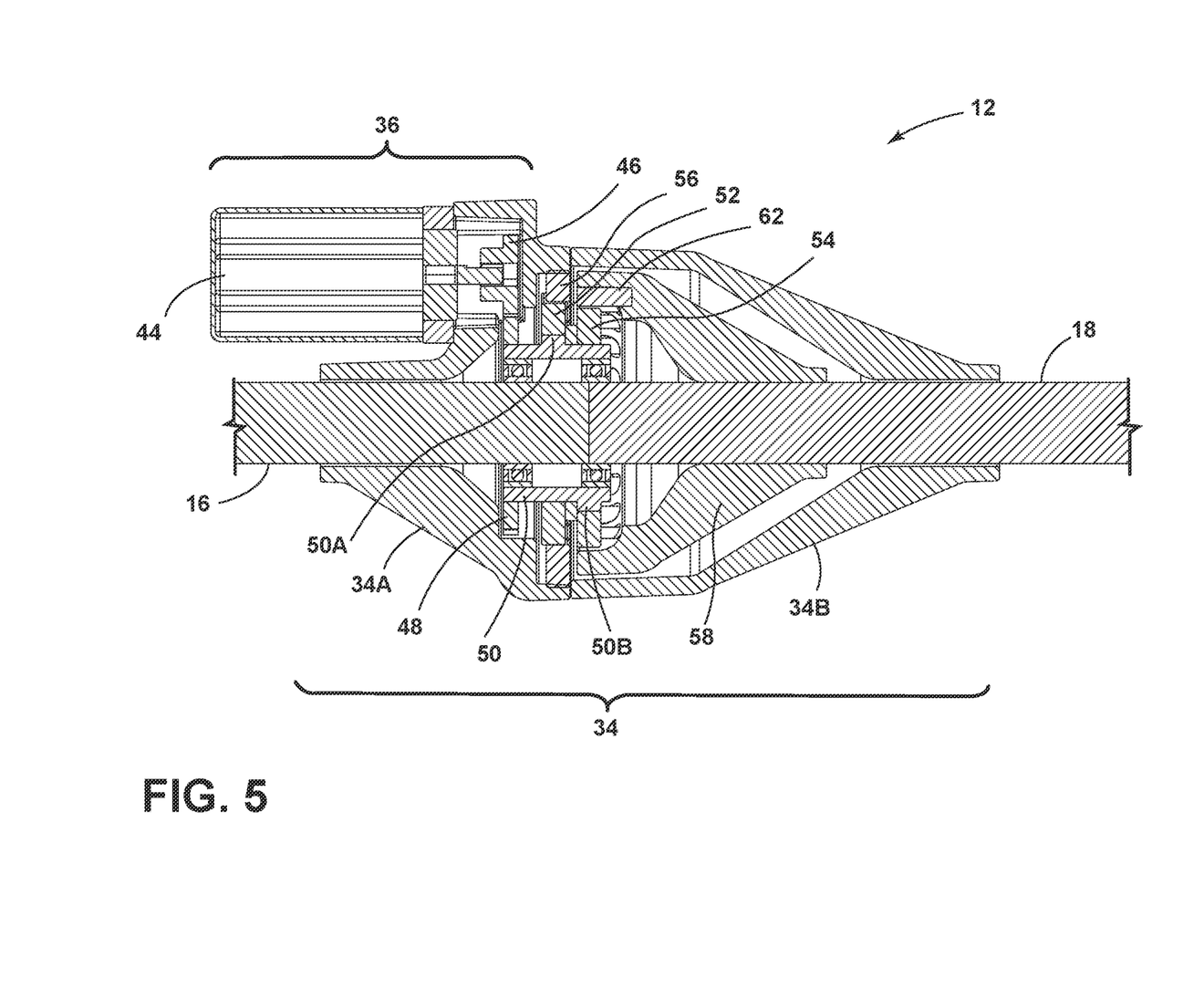
FIG. 5 is a side cross-sectional view of the cycloidal drive of FIG. 3.
Figure 6:
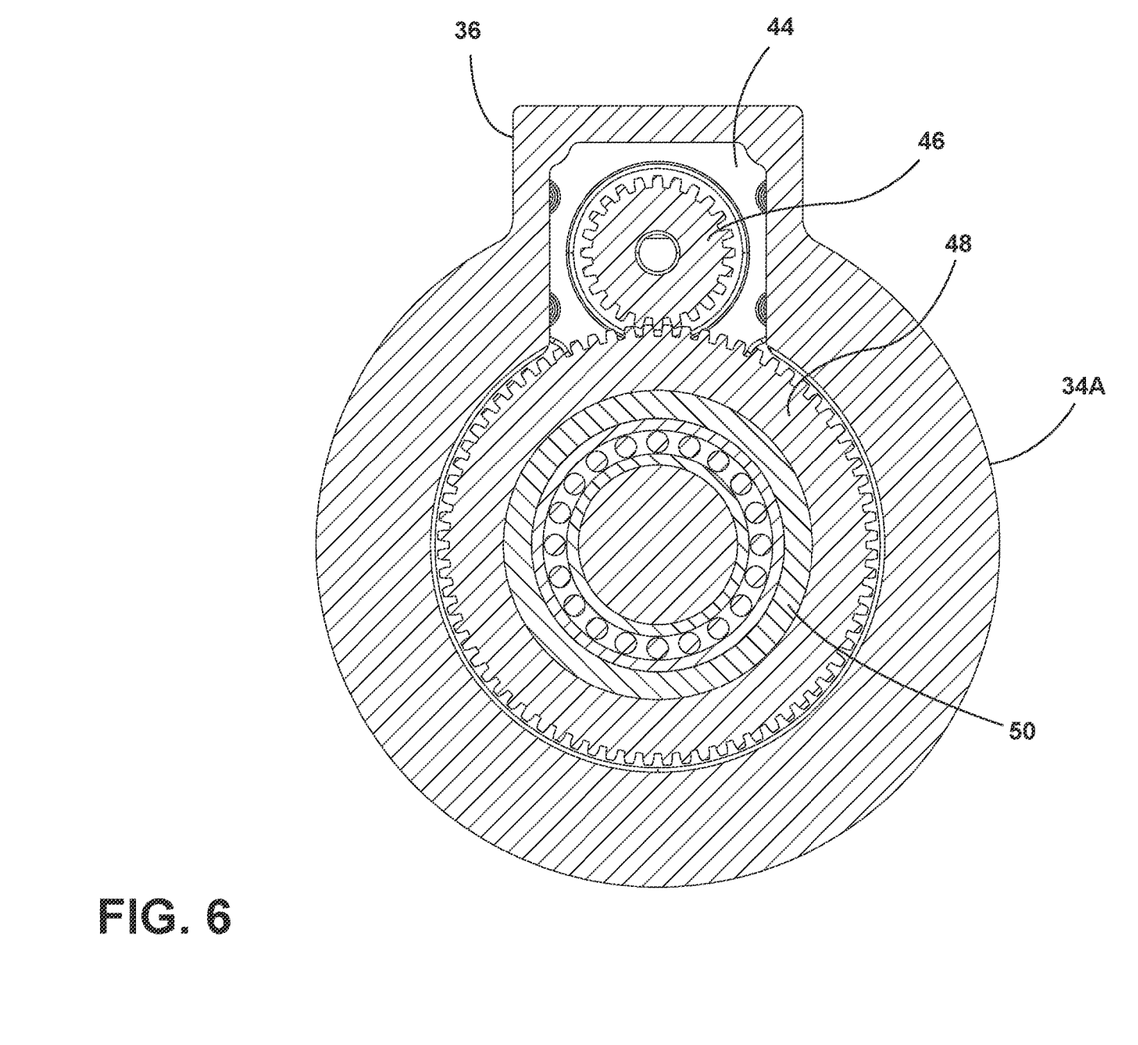
FIG. 6 is cross-section of the cycloidal drive taken along lines 6-6 of FIG. 4.

Referring now to FIGS. 5-6, the interior of the cycloidal drive 12 illustrated. The electric motor 44 is rotatably coupled to an input gear 46, and the input gear 46 is intermeshed with a cam drive gear 48. The cam drive gear 48 is coupled to the cycloidal gear assembly (discussed below). The cycloidal gear assembly provides a significant mechanical advantage to the electric motor 44, allowing relatively small electric motors to be used. In addition, the cycloidal gear assembly has a relatively small physical footprint, particularly when compared to a planetary gear assembly of the same gear reduction ratio, for example.

As also shown in FIGS. 5, the cycloidal gear assembly includes a cam shaft (or input shaft) 50, a first cycloidal gear 52, a second cycloidal gear 54, a cycloidal ring gear 56, and an output gear 58. The cam drive gear 48 is intermeshed with the input gear 46, which is driven by the electric motor 44. The cam drive gear 48 is in turn coupled to the cam shaft 50 and rotates the cam shaft 50 in the clockwise or counter-clockwise direction. The cam shaft 50 includes a first cam 50A to induce an eccentric oscillation of the first cycloidal gear 52 and includes a second cam 50B to induce an eccentric oscillation of the second cycloidal gear 54. The first cycloidal gear 52 is 180-degrees out of phase from the second cycloidal gear 54 to compensate unbalanced forces caused by rotation of the second cycloidal gear 54.

Figure 7:
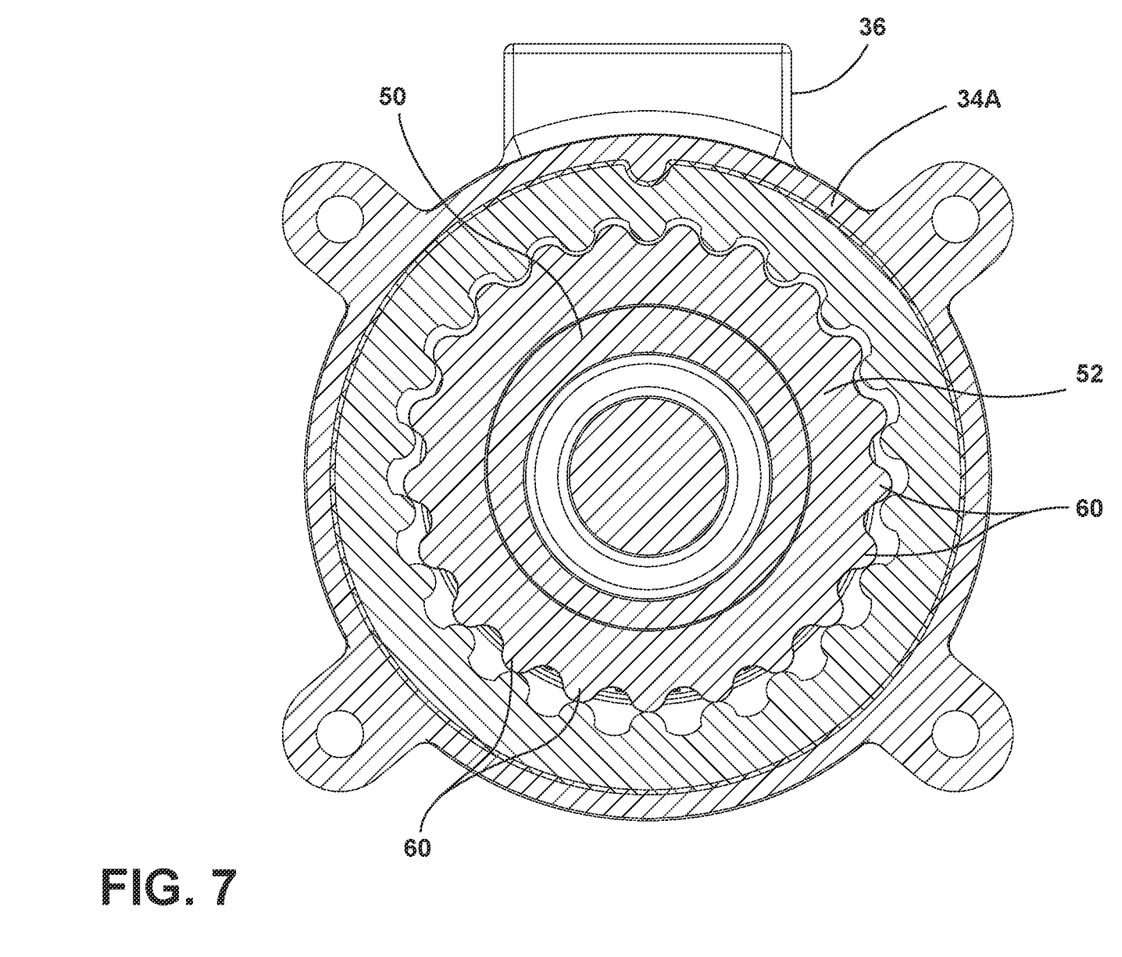
FIG. 7 is cross-section of the cycloidal drive taken along lines 7-7 of FIG. 4.
Figure 8:
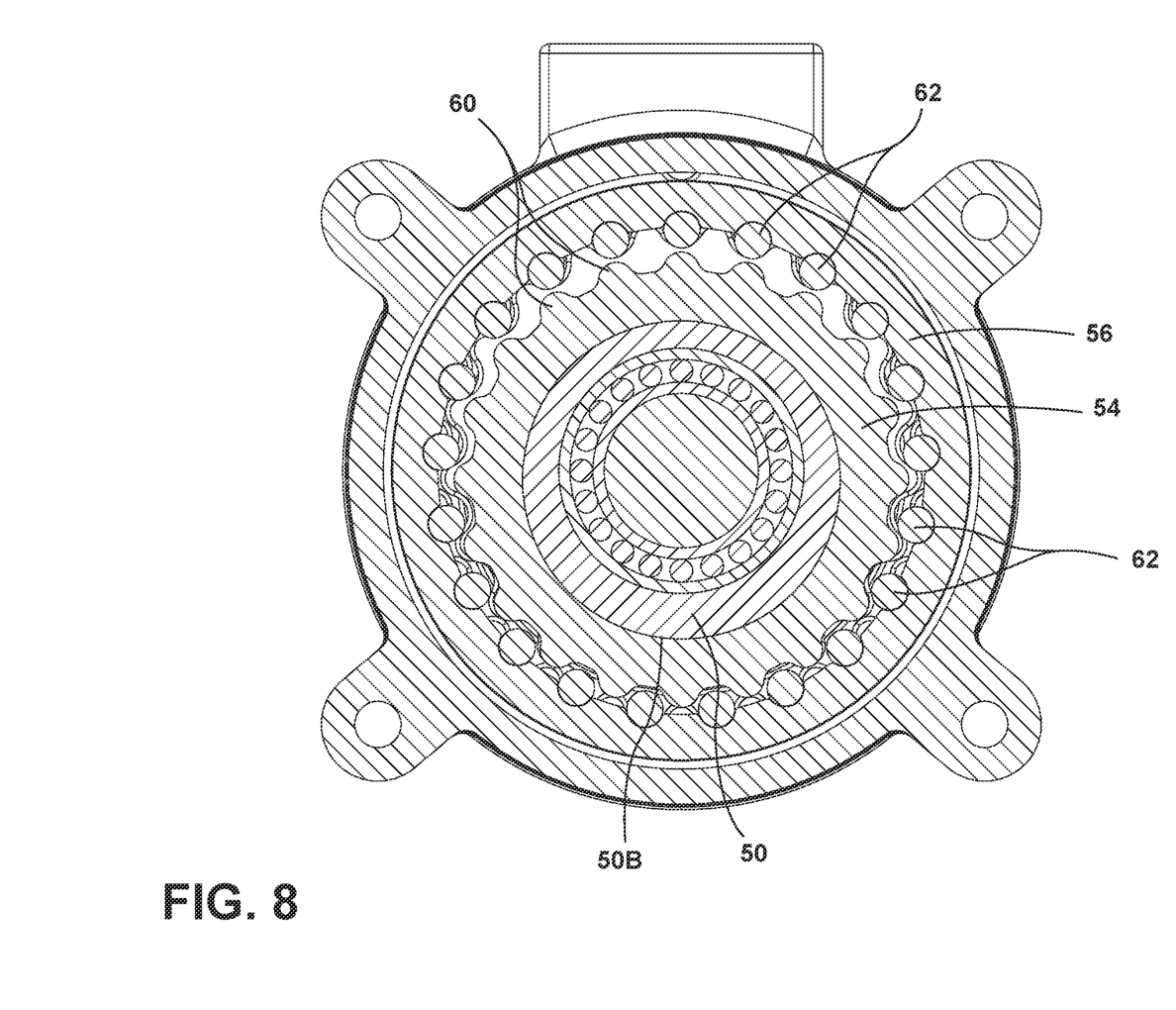
FIG. 8 is cross-section of the cycloidal drive taken along lines 8-8 of FIG. 4.

Rotation of the cam shaft 50 imparts a rotation of each cycloidal gear 52, 54 around the internal circumference of the cycloidal ring gear 56. As shown in FIGS. 7-8, each cycloidal gear 52, 54 includes a plurality of outer lobes 60. Rotation of the second cycloidal gear 54 imparts a reverse rotation of the ring gear rollers 62 as the second cycloidal gear 54 oscillates or wobbles in an eccentric pattern. Typically, the cycloidal drive 12 includes one fewer lobe 60 than rollers 62. One full rotation of the cam shaft 50 can result in rotation of the second cycloidal gear 54 by one lobe 60, imparting a significant speed reduction and mechanical advantage to the cycloidal gear 54. The reduction ratio i depends on the number of rollers N (e.g., 21 as shown in FIG. 8) and the number of lobes n (e.g., 20) according to the following formula:

$$i = \frac{n}{N-n}$$

Figure 9:
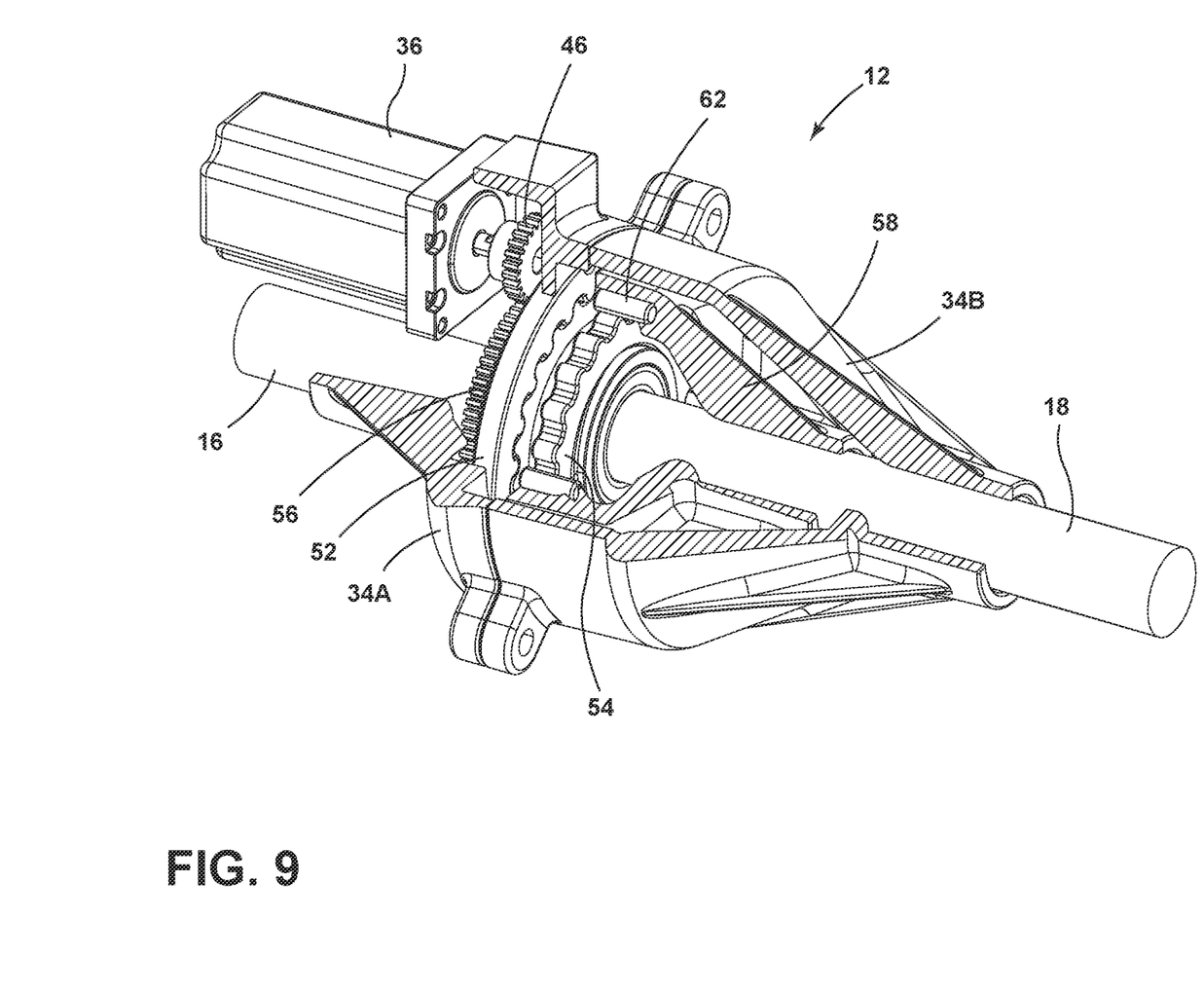
FIG. 9 is a first cut-away view of the cycloidal drive of FIG. 3.
Figure 10:
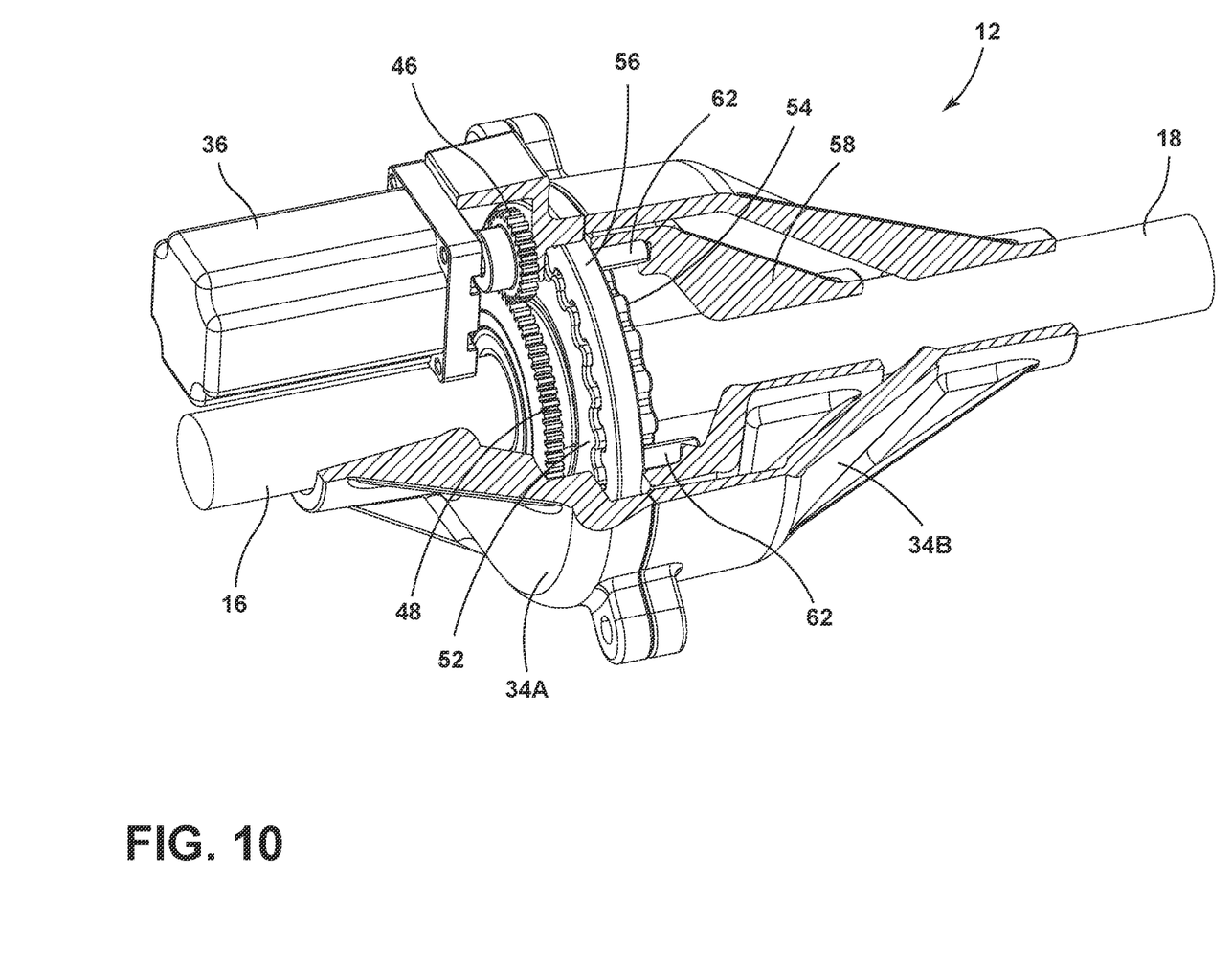
FIG. 10 is a second cut-away view of the cycloidal drive of FIG. 3.

In the illustrated embodiment, the cycloidal drive 12 provides a reduction ratio of 20:1, but other reduction ratios can be used in other embodiments. As shown in FIGS. 9-10, the reduced rotation is transmitted to the output gear 58, which rotates in unison with the second cycloidal gear 54. The output gear 58 includes a cone-shaped body and rotates in fixed relation relative to the second half-bar 18, such that the second half-bar 18 can be precisely rotated in the clockwise and counter-clockwise directions.

To reiterate, the first and second cycloidal gear 52, 54 are set into a "wobble" motion via the rotation of the cam shaft 50 that is rotatably coupled to the cam drive gear 48. For every rotation of the cam shaft 50, the second cycloidal gear 54 advances one roller 62 on the ring gear 56. The output gear 58 rotates in unison with the second cycloidal gear 54, thus achieving a significant torque advantage and speed reduction in a compact environment. The cycloidal drive 12 is disposed between the mutually facing ends of the divided torsion bar 14, the cycloidal drive 12 being operable to rotate the second half-bar 18 relative to the first half-bar 16 by operation of an electric motor 44 that is mechanically coupled to the cycloidal drive 12.

Though described above in connection with a cycloidal drive, the stabilizer bar can alternatively include a harmonic drive. A harmonic drive can include, for example, a flexible spine with external teeth, which is deformed by rotating an elliptical cam to engage with the internal gears of an outer ring gear. Like the cycloidal drive, the harmonic drive can achieve a high reduction ratio, meaning that the electric motor can remain compact. For example, after one rotation of the elliptical cam, the flexible spine and the ring gear are rotated relative to each other by an amount equal to two or fewer gear teeth, resulting in a significant speed reduction.

The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of any claims to the specific elements illustrated or described in connection with this embodiment. Any reference to elements in the singular, for example, using the articles "a," "an," "the," or "said," is not to be construed as limiting the element to the singular. Also, the terminologies "upper," "lower", "above", "below", etc. are intended for clarity of information while describing the embodiments as shown in the figures and are not to be construed as limiting the relationships between the geometric features of this invention.

The invention claimed is:

1. An adaptive stabilizer bar comprising:
a divided torsion bar having mutually facing ends;
a cycloidal drive disposed between the mutually facing ends of the divided torsion bar, wherein the cycloidal drive includes an electric motor coupled to a cycloidal gear assembly to rotate a first portion of the divided torsion bar relative to a second portion of the divided torsion bar, wherein the cycloidal gear assembly includes:
a cam drive gear intermeshed with an input gear that is rotatable by the electric motor,
a cam shaft that rotates in unison with the cam drive gear,
first and second cycloidal gears that oscillate by operation of the cam shaft, and
a ring gear surrounding at least one of the first and second cycloidal gears,
wherein the cam shaft includes a first cam for engaging the first cycloidal gear and includes a second cam for engaging the second cycloidal gear, the second cam being axially offset from the first cam.

2. The adaptive stabilizer bar of claim 1, wherein the first cam rotates 180-degrees of out phase from the second cam.

3. The adaptive stabilizer bar of claim 1, wherein the divided torsion bar includes first and second longitudinal segments connected to first and second arm segments, respectively.

4. The adaptive stabilizer bar of claim 3, wherein the divided torsion bar is subjected to torsional forces when the first and second arm segments move relative to one another.

5. The adaptive stabilizer bar of claim 1, wherein the cycloidal gear assembly is housed within a gearbox housing, and wherein the electric motor is housed within a motor housing that extends from an exterior portion of the gearbox housing.

6. The adaptive stabilizer bar of claim 5, wherein the gearbox housing includes first and second co-axial openings for a first half-bar and a second half-bar of the divided torsion bar.

7. The adaptive stabilizer bar of claim 1, wherein each of the first and second cycloidal gears include a plurality of lobes along an outer periphery thereof.

8. An adaptive stabilizer bar comprising:
a divided torsion bar having mutually facing ends;
a cycloidal drive disposed between the mutually facing ends of the divided torsion bar, wherein the cycloidal drive includes an electric motor coupled to a cycloidal gear assembly to rotate a first portion of the divided torsion bar relative to a second portion of the divided torsion bar, wherein the cycloidal gear assembly includes:
a cam drive gear intermeshed with an input gear that is rotatable by the electric motor,
a cam shaft that rotates in unison with the cam drive gear,
first and second cycloidal gears that oscillate by operation of the cam shaft,
a ring gear surrounding at least one of the first and second cycloidal gears, and
a plurality of rollers sandwiched between an outer portion of the second cycloidal gear and an inner portion of an output gear.

9. The adaptive stabilizer bar of claim 8, wherein the output gear includes a conical body that narrows from a first outer diameter to a second outer diameter.

10. An adaptive stabilizer bar comprising:
a divided torsion bar coupled to first and second arm segments, the first arm segment being disposed at a first end of the divided torsion bar for mounting to a first vehicle wheel, the second arm segment disposed at a second end of the divided torsion bar for mounting to a second vehicle wheel, wherein the divided torsion bar includes a first half-bar and a second half-bar and is subjected to a torsional load when the first and second arm segments move relative to each another;
a cycloidal drive disposed between the first half-bar and the second-half bar, the cycloidal drive being operable to rotate the first half-bar relative to the second half-bar by operation of an actuator that is mechanically coupled to the cycloidal drive, wherein the cycloidal drive includes:
a cam drive gear intermeshed with an input gear that is rotatable by the actuator,
a cam shaft that rotates in unison with the cam drive gear,
first and second cycloidal gears that oscillate by operation of the cam shaft, and
a ring gear surrounding at least one of the first and second cycloidal gears,
wherein the cam shaft includes a first cam for engaging the first cycloidal gear and includes a second cam for engaging the second cycloidal gear, the second cam being axially offset from the first cam.

11. The adaptive stabilizer bar of claim 10, wherein the cycloidal drive includes a gearbox housing, and wherein the actuator is housed within a motor housing that extends from an exterior portion of the gearbox housing.

12. The adaptive stabilizer bar of claim 10, wherein the gearbox housing includes first and second co-axial openings for the first half-bar and the second half-bar, respectively.

13. An adaptive stabilizer bar comprising:
a divided torsion bar coupled to first and second arm segments, the first arm segment being disposed at a first end of the divided torsion bar for mounting to a first vehicle wheel, the second arm segment disposed at a second end of the divided torsion bar for mounting to a second vehicle wheel, wherein the divided torsion bar includes a first half-bar and a second half-bar and is subjected to a torsional load when the first and second arm segments move relative to each another;
a cycloidal drive disposed between the first half-bar and the second-half bar, the cycloidal drive being operable to rotate the first half-bar relative to the second half-bar by operation of an actuator that is mechanically coupled to the cycloidal drive, wherein the cycloidal drive includes:
a cam drive gear intermeshed with an input gear that is rotatable by the actuator,
a cam shaft that rotates in unison with the cam drive gear,
first and second cycloidal gears that oscillate by operation of the cam shaft,
a ring gear surrounding at least one of the first and second cycloidal gears, and a plurality of rollers sandwiched between an outer portion of the second cycloidal gear and an inner portion of an output gear.

14. A cycloidal drive for an adaptive stabilizer bar, the cycloidal drive comprising:
an electrical motor within a motor housing; and
a cycloidal gear assembly within a gearbox housing, the electrical motor being coupled to the cycloidal gear assembly via an input gear, wherein the gearbox housing includes first and second co-axial openings for a first half-bar and a second half-bar of a divided torsion bar,
wherein the cycloidal gear assembly includes a cam drive gear intermeshed with the input gear, a cam shaft that rotates in unison with the cam drive gear, first and second cycloidal gears that oscillate by operation of the cam shaft, and a ring gear surrounding at least one of the first and second cycloidal gears,
wherein the cam shaft includes a first cam for engaging the first cycloidal gear and includes a second cam for engaging the second cycloidal gear, the second cam being axially offset from the first cam.

15. The cycloidal drive of claim 14, wherein the cycloidal drive includes a gearbox housing, and wherein the actuator is housed within a motor housing that extends from an exterior portion of the gearbox housing.

16. The cycloidal drive of claim 14, wherein the gearbox housing includes first and second co-axial openings for the first half-bar and the second half-bar, respectively.

17. A cycloidal drive for an adaptive stabilizer bar, the cycloidal drive comprising:
an electrical motor within a motor housing; and
a cycloidal gear assembly within a gearbox housing, the electrical motor being coupled to the cycloidal gear assembly via an input gear, wherein the gearbox housing includes first and second co-axial openings for a first half-bar and a second half-bar of a divided torsion bar,
wherein the cycloidal gear assembly includes:
a cam drive gear intermeshed with the input gear,
a cam shaft that rotates in unison with the cam drive gear,
first and second cycloidal gears that oscillate by operation of the cam shaft,
a ring gear surrounding at least one of the first and second cycloidal gears, and
a plurality of rollers sandwiched between an outer portion of the second cycloidal gear and an inner portion of an output gear.

\* \* \* \* \*